United States Patent
Byeon et al.

(10) Patent No.: US 8,807,768 B2
(45) Date of Patent: Aug. 19, 2014

(54) DISPLAY APPARATUS

(75) Inventors: Jong-Hyun Byeon, Pyeongtaek-si (KR); Seung-Hyun Yun, Pyeongtaek-si (KR); Moung-Youb Lee, Pyeongtaek-si (KR); Yun-Joo Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 12/575,313

(22) Filed: Oct. 7, 2009

(65) Prior Publication Data

US 2010/0259828 A1 Oct. 14, 2010

(30) Foreign Application Priority Data

Apr. 9, 2009 (KR) .......................... 10-2009-0030912
Apr. 9, 2009 (KR) .......................... 10-2009-0030913

(51) Int. Cl.
*G02B 5/02* (2006.01)
*G02B 27/00* (2006.01)

(52) U.S. Cl.
CPC .......... *G02B 5/0278* (2013.01); *G02B 27/0018* (2013.01)
USPC .......................................... 359/601; 359/609

(58) Field of Classification Search
USPC .............. 348/842; 349/58; 359/609; 361/807
See application file for complete search history.

(56) References Cited

U.S. PATENT DOCUMENTS

| | | | |
|---|---|---|---|
| 5,061,052 A | 10/1991 | DeJesus | |
| 5,400,177 A | 3/1995 | Petitto et al. | |
| 5,739,880 A | 4/1998 | Suzuki et al. | |
| 5,828,410 A | 10/1998 | Drapeau | |
| 6,276,803 B1 | 8/2001 | Aoyama et al. | 353/81 |
| 6,313,946 B1 | 11/2001 | Petitto et al. | |
| 6,919,678 B2 | 7/2005 | Ozolins et al. | |
| 7,222,969 B2 | 5/2007 | Veligdan | |
| 7,223,009 B2 * | 5/2007 | Henriet et al. | 362/617 |
| 7,230,669 B1 * | 6/2007 | Tashiro et al. | 349/153 |
| 7,298,076 B2 * | 11/2007 | Ozolins et al. | 313/479 |
| 7,551,372 B2 | 6/2009 | Xun et al. | |
| 7,567,380 B2 | 7/2009 | Peterson et al. | |
| 7,719,745 B2 | 5/2010 | Yamada | |
| 2002/0118339 A1 * | 8/2002 | Lowe | 351/209 |
| 2003/0048400 A1 | 3/2003 | Kim et al. | 349/117 |
| 2003/0231144 A1 | 12/2003 | Cho et al. | 345/1.3 |
| 2006/0158579 A1 | 7/2006 | Hasegawa | |
| 2006/0198033 A1 | 9/2006 | Soyama et al. | |

(Continued)

FOREIGN PATENT DOCUMENTS

JP 2000295483 A * 10/2000
JP WO 02/27399 4/2002

(Continued)

OTHER PUBLICATIONS

Machine Translation of JP-2004-29220.*

(Continued)

*Primary Examiner* — Stephone B Allen
*Assistant Examiner* — Jeffrey Madonna
(74) *Attorney, Agent, or Firm* — Ked & Associates, LLP (57) ABSTRACT

A display apparatus includes a display module, a front panel provided in front of the display module, and a pattern which is formed over the front panel. One portion of the pattern that is closer to an edge of the front panel allows for less transmittance of light than other portions of the pattern.

16 Claims, 12 Drawing Sheets

(56) References Cited

U.S. PATENT DOCUMENTS

| | | | |
|---|---|---|---|
| 2007/0103854 A1 | 5/2007 | Yu et al. | |
| 2007/0291203 A1 | 12/2007 | Nakahara et al. | |
| 2009/0109366 A1 | 4/2009 | Lippey | |
| 2009/0231524 A1 | 9/2009 | Tanaka | |
| 2009/0322982 A1 | 12/2009 | Finnegan | |
| 2010/0097447 A1 | 4/2010 | Tomisawa et al. | |
| 2010/0232026 A1 | 9/2010 | Park et al. | |
| 2010/0232027 A1 | 9/2010 | Park et al. | |
| 2010/0246104 A1 | 9/2010 | Park et al. | |
| 2010/0259827 A1* | 10/2010 | Lee et al. | 359/609 |
| 2010/0259828 A1* | 10/2010 | Byeon et al. | 359/609 |
| 2010/0259829 A1* | 10/2010 | Kim et al. | 359/609 |
| 2010/0315570 A1 | 12/2010 | Mathew et al. | |
| 2011/0007398 A1 | 1/2011 | Lim et al. | |
| 2011/0013346 A1 | 1/2011 | Ju et al. | |

FOREIGN PATENT DOCUMENTS

| | | | |
|---|---|---|---|
| JP | 2003-215304 | | 7/2003 |
| JP | 2004-029220 | | 1/2004 |
| JP | 2005-166811 | | 6/2005 |
| JP | 2005-242265 | | 9/2005 |
| JP | 2005257794 A | * | 9/2005 |
| JP | 2005354474 A | * | 12/2005 |
| JP | 2006-047271 | | 2/2006 |
| JP | 2006047271 A | * | 2/2006 |
| JP | 2006-073545 | | 3/2006 |
| JP | 2006-128421 | | 5/2006 |
| JP | 2006-179683 | | 7/2006 |
| JP | 2008209764 A | * | 9/2008 |
| JP | 2011123406 A | * | 6/2011 |
| KR | 10-0817560 | | 3/2008 |
| KR | 10-0841318 | | 6/2008 |
| KR | 10-2008-0106604 | | 12/2008 |
| WO | WO 2010055565 A1 | * | 5/2010 |

OTHER PUBLICATIONS

Office Action issued in U.S. Appl. No. 12/630,038 dated Feb. 3, 2011.
Office Action issued in U.S. Appl. No. 12/630,026 dated Mar. 21, 2011.
Office Action issued in U.S. Appl. No. 12/630,009 dated Apr. 5, 2011.
Notice of Allowance issued in U.S. Appl. No. 12/630,009 dated May 16, 2011.
U.S. Office Action issued in U.S. Appl. No. 12/575,239 dated Jun. 28, 2011.
International Search Report dated May 18, 2010.
International Search Report dated May 26, 2010.
International Search Report dated Mar. 22, 2010.
U.S. Office Action issued in U.S. Appl. No. 12/575,239 dated Dec. 7, 2011.
United States Office Action dated Nov. 21, 2012 issued in U.S. Appl. No. 12/630,064.

* cited by examiner

DISPLAY APPARATUS

CROSS-REFERENCE TO RELATED APPLICATIONS

The present application claims priority under 35 U.S.C. 119 and 35 U.S.C. 365 to Korean Patent Applications No. 10-2009-0030914 and No. 10-2009-0030915 (filed on 9 Apr. 2009), which is hereby incorporated by reference in its entirety.

BACKGROUND

1. Field

One or more embodiments described herein relate to a display apparatus.

2. Background

Various electronic devices such as mobile communication terminals, digital cameras, notebook computers, monitors and televisions (TV) include one or more display apparatuses. These apparatuses include Liquid Crystal Display Devices (LCDs), Plasma Display Panels (PDPs), Electro Luminescent Displays (ELDs) and Vacuum Fluorescent Displays (VFDs). Many of these devices have drawbacks that require attention.

BRIEF DESCRIPTION OF THE DRAWINGS

FIGS. 21(a)-(e) are diagrams showing a cross-sectional views that result from various stages of an embodiment of a method for manufacturing a display apparatus.

DETAILED DESCRIPTION OF THE EMBODIMENTS

Figure 1:
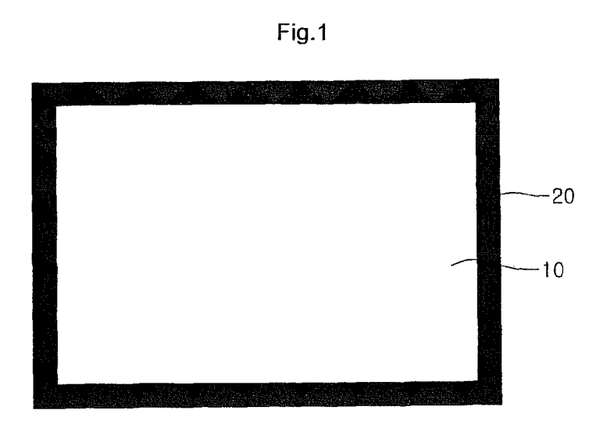
FIG. 1 is a diagram showing display and non-display regions of a display apparatus.

FIG. 1 shows a display region 10 and a non-display region 20 of a display apparatus as seen from a front perspective view by a user. The non-display region is formed at an outer region of the display apparatus surrounding the display region.

A light shielding layer may be formed at non-display region 20. The light shielding layer may shield light passing through an outer region of the display apparatus. Accordingly, only images to be displayed are visible to a user and structures which are disposed at the outer region of the display apparatus are invisible to the user.

The light shielding layer formed at non-display region 20 may have black color for effectively shielding light. For example, the light shielding layer may be a black layer which is printed in black. When seen by a user, the non-display region of the display apparatus therefore may be black. When the display apparatus is powered off, display region 10 has a black appearance similar to the color of the non-display region.

The reflection, absorption or diffusion of an external light may be different in display region 10 and non-display region 20. For example, a portion of the external light may be reflected at display region 10 by an internal display panel, and most of the external light may be absorbed at non-display 20 where a black layer is printed. Accordingly, when the display apparatus is powered off, a visual difference between the display region and non-display region of the display apparatus may occur. The visual difference may clearly appear at the boundary portion between the display region 10 and the non-display region 20, and thus the design characteristic of the display apparatus can be degraded.

FIGS. 2 to 10 show a first embodiment of a display apparatus which includes a display module 100, a front panel 110, a light shielding layer 120, and a reflective layer 200. The display module 100 radiates light in a front direction where front panel 110 is disposed and thereby displays images. The display module may, for example, be a liquid crystal display module in which case a liquid crystal panel (not shown) and a backlight unit (not shown) may be included.

The liquid crystal panel displays pictures using light provided from the backlight unit. For this, the liquid crystal panel may include a liquid crystal layer, and a thin film transistor (TFT) substrate and a color filter substrate which face each other about the liquid crystal layer. And, the backlight unit may provide light using a light emitting diode (LED). In other embodiments, the display apparatus may be an Electro Luminescent Display (ELD), a Vacuum Fluorescent Display (VFD), OLED, LED, PDP, and so on.

The front panel 110 is disposed in front of the display module 100 at a certain distance, and thus protects the display module from external impact. By transmitting light radiated from the display module, front panel 110 allows an image (which is displayed at the display module 100) to be visible. The front panel may be formed of a plastic or glass material such as acrylic having impact resistance and light permeability.

Figure 2:
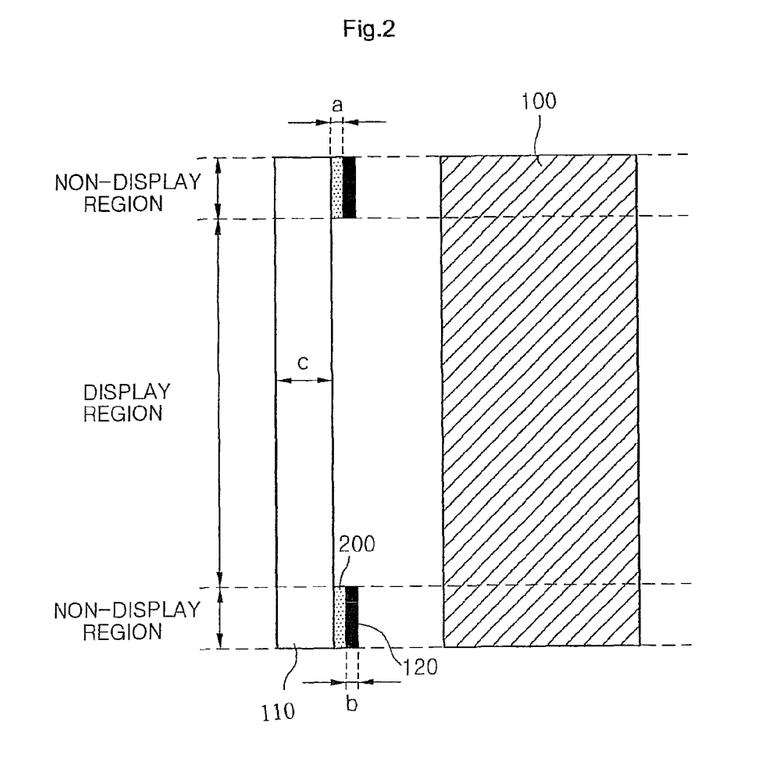
FIGS. 2 to 10 are diagrams showing cross-sectional views of a first embodiment of a display apparatus.

As further shown in FIG. 2, front panel 110 includes a display region which transmits light radiated from display module 100 to display images and a non-display region surrounding the display region. A light shielding layer 120 for shielding light may be formed at the non-display region. That is, the light shielding layer may be formed over the front panel near a periphery of the front panel.

According to one arrangement, the reflective layer 200 may be formed on a surface of front panel 110 to overlap light shielding layer 120. That is, light shielding layer 120 and reflective layer 200 may be formed to overlap each other at the non-display region of front panel 110. The reflective layer may be formed by depositing a metal (for example, nickel (Ni) or aluminum (Al)) on the one surface of the front panel 110. For example, the reflective layer may be a metal thin-film layer formed by depositing a metal.

Moreover, reflective layer 200 may be light-reflectible and light-transmittable. That is, the reflective (e.g., metal thin-film) layer may be light-reflectible and light-transmittable based on its metal characteristics and thin-film characteristics. As a result, the reflective layer may reflect a portion of external light and transmit a portion of external light.

In at least one arrangement, light shielding layer 120 may be disposed between reflective layer 200 and display module 100. More specifically, as shown in FIG. 2, reflective layer 200 may be formed at a first surface, which is nearer to display module 100 among the surfaces of front panel 110, and light shielding layer 120 may be stacked and formed on the reflective layer. The light shielding layer 120 may be a black layer printed in black. For example, the light shielding layer 120 may be formed by forming a black print layer on reflective layer 200 formed at the first surface of the front panel 110.

As described above, reflective layer 200 may be a light-reflectible and light-transmittable, and thus a portion of an external light incident on the non-display region is reflected by the reflective layer and is again radiated to the front of the display apparatus, and another portion of external light incident on the non-display region transmits through the reflective layer and is absorbed into light shielding layer 120.

Accordingly, reflection of the external light that occurs in the display region of the display apparatus may occur in the non-display region and more specifically in the reflective layer 200 which is formed at the non-display region.

Moreover, a portion of external light incident on the non-display region transmits through reflective layer 200 and is absorbed into light shielding layer 120, which, for example, may be a printed black layer. Therefore, the absorption of external light that occurs in the display region may also occur to the same or similar degree in the non-display region, and thus both the display and non-display regions may have the same or similar a black appearance. As a result, when the display apparatus is seen by a viewer from the front, similar visual reflection sensitivity may be perceived in the display and the non-display regions, and as a result a visual difference between the display and non-display regions decreases.

Referring again to FIG. 2, the thickness 'a' of the reflective layer 200 may be thinner than the thickness 'b' of the light shielding layer 120 and the thickness 'c' of the front panel 110. As the thickness 'a' of the reflective layer 200 increases, the reflection rate of reflective layer 200 increases and the transmission rate of the reflective layer decreases. As a result, the non-display region may be appear to be very bright. As the thickness 'a' of reflective layer 200 decreases, the transmission rate of the reflective layer increases and the reflection rate of the reflective layer 200 may excessively decrease.

Because the reflective layer is light-reflexible and light-transmittable, to allow the non-display region to appear black and have a reflection sensitivity when seen by a user, the thickness 'a' of the reflective layer 200 may be about 0.005 to about 0.1 mm and the transmission rate of the reflective layer 200 may be about 30 to about 50%. Moreover, the thickness 'b' of light shielding layer 120 may be about 0.5 to about 5 mm, and the thickness 'c' of the front panel 110 may be about 1 to about 8 mm.

The thickness 'a' of reflective layer 200, material, and color of the light shielding layer 120 (e.g., the brightness of the printed black layer) may vary according to the configuration of display module 100 or front panel 110 and the distance between the display module and front panel 110. That is, thickness 'a' of the reflective layer, material, and the color of light shielding layer 120 may be determined so that the colors and reflection sensitivity of the display and non-display regions are the same or similar. As a result, the display and non-display regions may be appear to be identically sensed when seen by a user as a result of their reflection rates being similar or identical.

Because reflective layer 200 and light shielding layer 120 are formed at the non-display region of the display apparatus to overlap each other, the differences between the display and non-display regions as perceived by a viewer decreases, thereby making the boundary between those regions to be virtually or nearly imperceptible when power is off. That is, the front surface of the display apparatus including the display and non-display regions will appear to be a single layer when seen by a viewer.

In FIG. 2, reflective layer 200 and light shielding layer 120 are shown to have the same width and completely overlap each other. However, in alternative arrangements, a portion of the reflective layer may not overlap the light shielding layer or a portion of the light shielding layer may not overlap the reflective layer.

Figure 3:
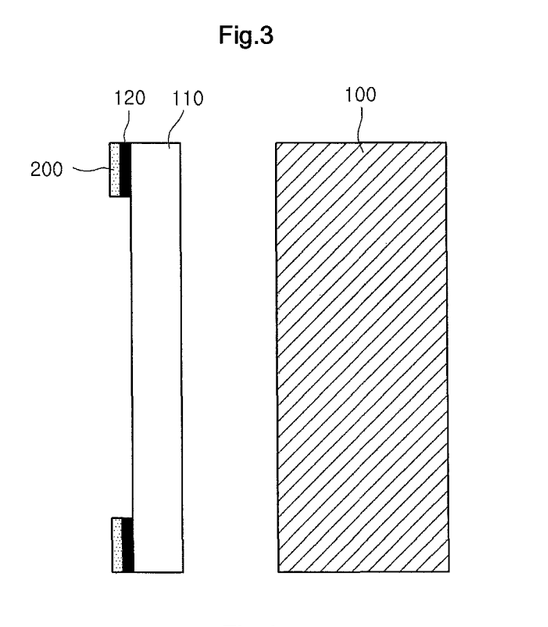

Referring FIG. 3, in another arrangement the light shielding layer 120 may be formed at a second surface which is farther away from display module 100 among the surfaces of front panel 110, and reflective layer 200 may be stacked and formed on light shielding layer 120. The light shielding layer 120 may be formed, for example, by printing a black layer at the second surface of front panel 110 and reflective layer 200 may be formed on light shielding layer 120, i.e., the printed black layer.

Figure 4:
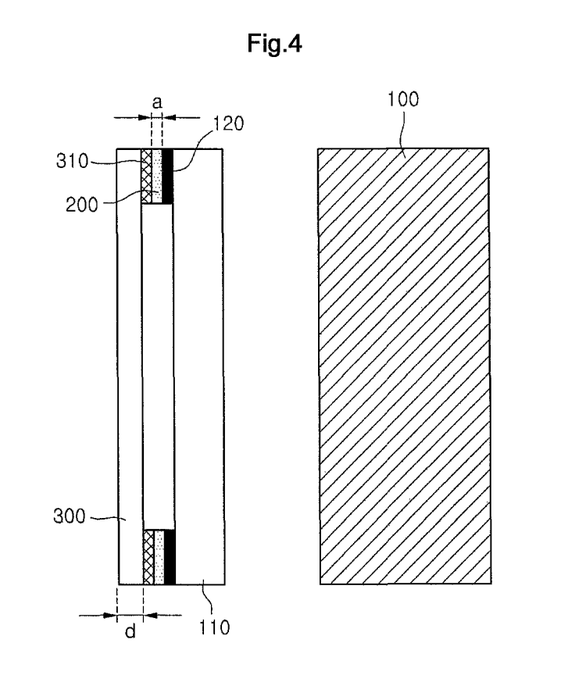

Referring to FIG. 4, in another arrangement a transparent film 300 is disposed on front of the front panel. The transparent film may be formed, for example, from PolyEthylen Terephthalate (PET) and may include one or more function layers for enhancing the light characteristic of a displayed image. As shown in FIG. 4, transparent film 300 may be adhered to the front panel on which light shielding layer 120 and reflective layer 200 are formed. An adhesive layer 310 may be formed between the transparent film and front panel, and more specifically between the transparent film and reflective layer 200.

The thickness 'd' of transparent film 300 may be about 0.05 to 0.4 mm, and may be thicker than thickness 'a' of layer 200. A hard coating layer may be formed at the front surface of transparent film 300 to protect the transparent film from external impact.

Figure 5:
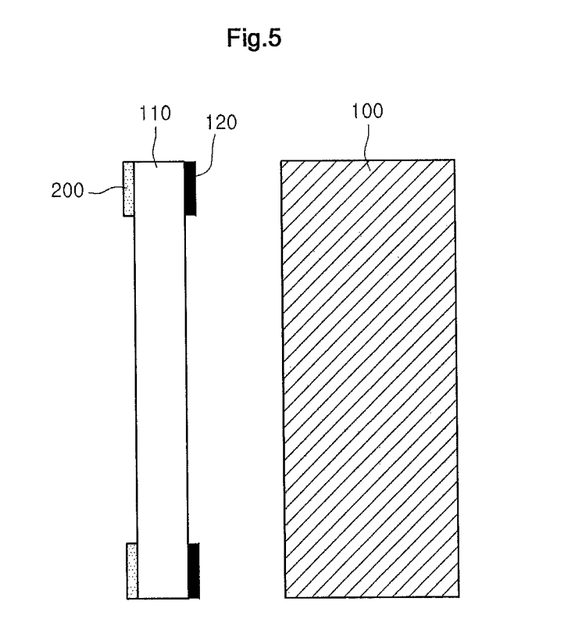

As shown in FIG. 5, in another arrangement light shielding layer 120 and reflective layer 200 may be formed at respective surfaces of front panel 110. That is, light shielding layer 120 may be formed at a first surface of front panel 110 and reflective layer 200 may be formed at a second surface of the front panel.

Figure 6:
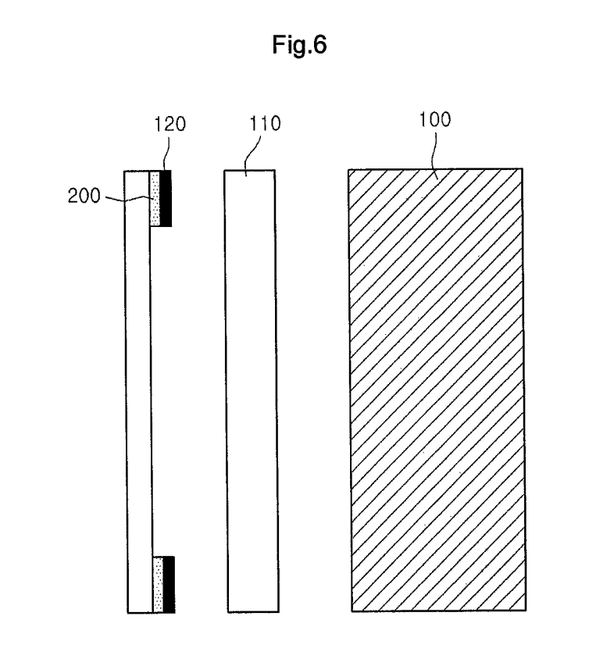
Figure 7:
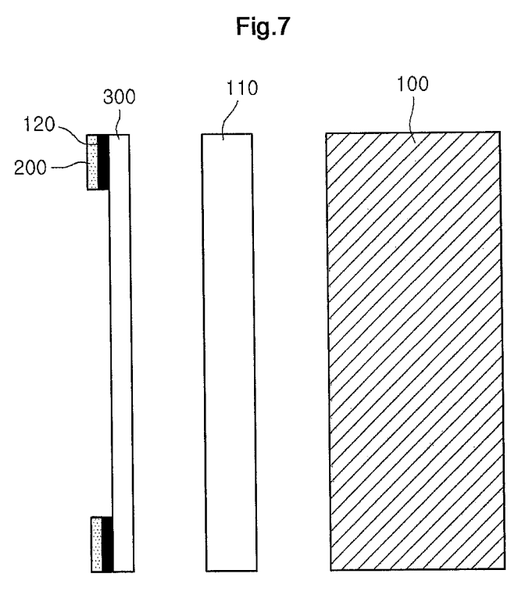
Figure 8:
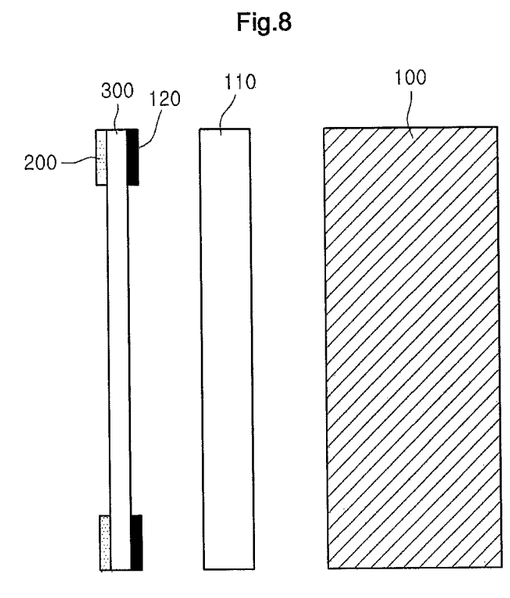

As shown in FIGS. 6 to 8, in other arrangements light shielding layer 120 and reflective layer 200 are formed on transparent film 300 which is disposed in front of front panel 110. As shown in FIG. 6, reflective layer 200 may be formed at a first surface which is nearer to the display module 100 among the surfaces of transparent film 300 and light shielding layer 120 may be stacked and formed on the reflective layer. An adhesive layer (not shown) may be formed between the light shielding layer and front panel, to thereby adhere and fix the transparent film 300 to the front panel 110.

Alternatively, as shown in FIG. 7, light shielding layer 120 may be formed at a second surface which is farther away from display module 100 among the surfaces of the transparent film 300 and reflective layer 200 may be stacked and formed on the light shielding layer. An adhesive layer (not shown) may be formed between transparent film 300 and front panel 110, to thereby adhere and fix transparent film 300 to front panel 110.

Referring to FIG. 8, light shielding layer 120 may be formed at a first surface of transparent film 300 and reflective layer 200 may be formed at a second surface of the transparent film, and an adhesive layer (not shown) may be formed between light shielding layer 120 and front panel 110.

Figure 9:
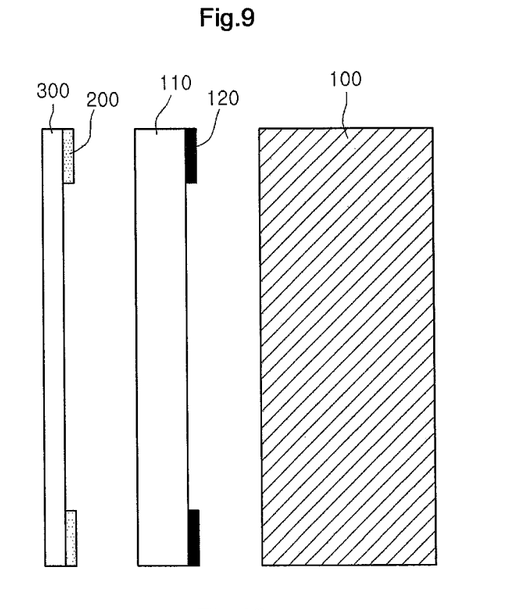

As shown in FIG. 9, light shielding layer 120 and reflective layer 200 may be formed at front panel 110 and transparent film 300, respectively. That is, light shielding layer 120 may be formed at a first surface of front panel 110 and reflective layer 200 may be formed at a first surface of transparent film 300.

Figure 10:
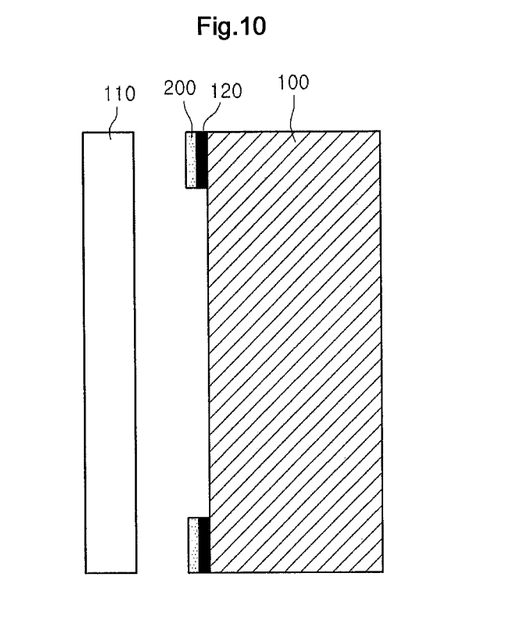

Referring to FIG. 10, in another arrangement at least one of light shielding layer 120 or reflective layer 200 may be formed on display module 100, for example, the upper substrate of the display panel. That is, light shielding layer 120 may be formed on display module 100 and reflective layer 200 may be stacked on the light shielding layer, or may be formed at one surface of front panel 110 or one surface of transparent film 300.

Figure 11:
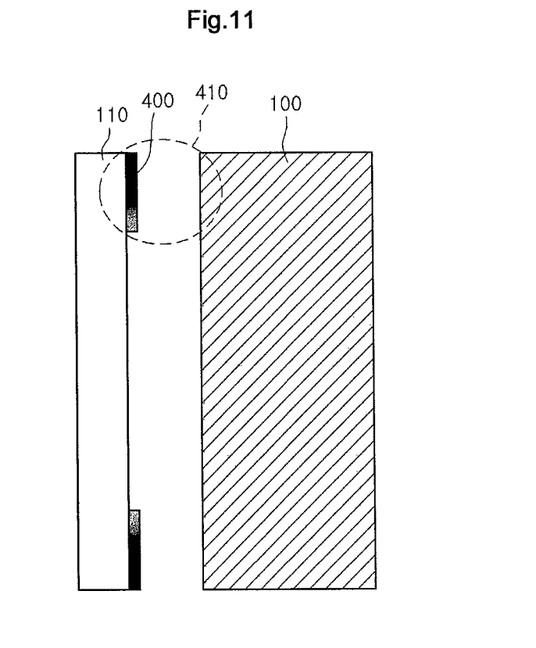
FIGS. 11 to 13 are diagrams showing cross-sectional views of a second embodiment of a display apparatus.
Figure 12:
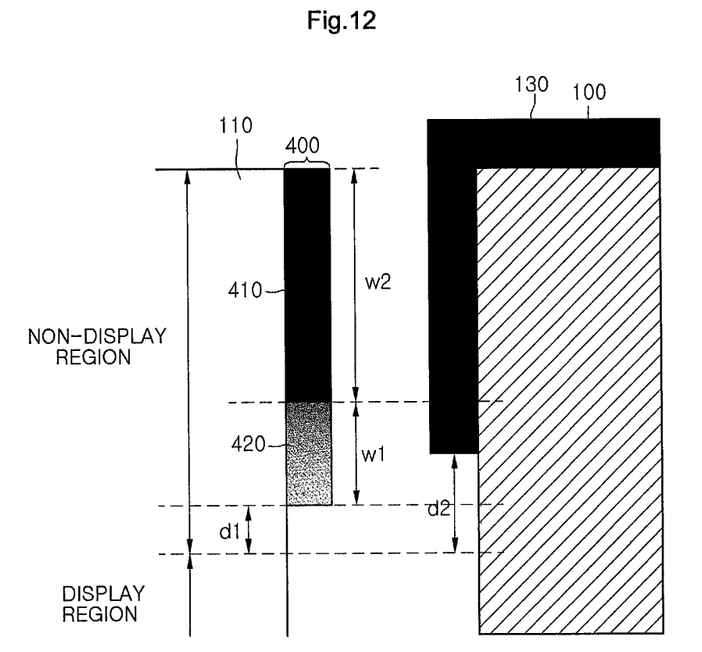
Figure 13:
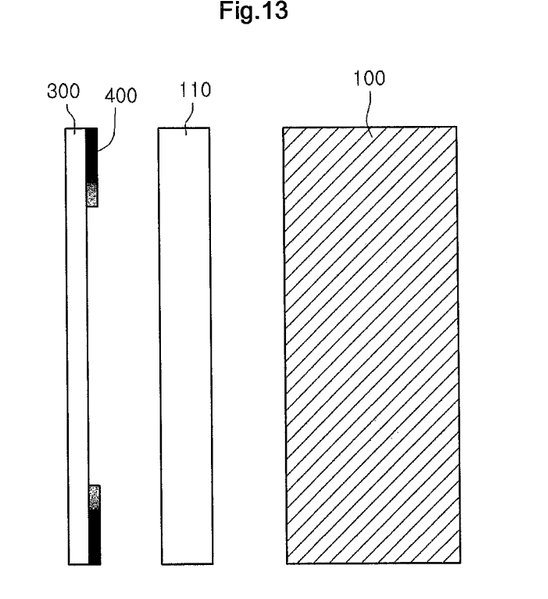

FIGS. 11 to 13 show arrangements according to a second embodiment of a display apparatus. In these figures, a gradation pattern may be formed at a non-display region. In the gradation pattern, at least one of color, reflection rate or light transmittance may be varied relative to other portions of the display apparatus.

Referring to FIG. 11, in one arrangement light shielding layer 400 is formed at the non-display region of front panel 110 and a pattern 420 is formed adjacent to the light shielding layer 400. Light transmittance in the pattern may incrementally decrease as the pattern progresses in a direction towards an outermost edge of the non-display region. In other words, in pattern 420, a color tone in the pattern may incrementally become darker in portions of the pattern that are more closely adjacent to the outermost edge of the non-display region than other portions of the pattern.

FIG. 12 shows an exploded view of the dotted-line portion 410 of FIG. 11. In this figure, light shielding layer 400 and pattern 420 are formed on front panel 110, with pattern 420 formed adjacent to light shielding layer 400. For example pattern 420 may be formed in contact with light shielding layer 400 and at a position that is closer to the display region than the light shielding layer 400.

Light shielding layer 400 corresponds to a region in which light transmittance is uniform and pattern 420 corresponds to a region in which light transmittance varies incrementally or according to a predetermined rate. That is, the light transmittance of pattern 420 decreases as it progresses in a direction towards light shielding layer 400. Accordingly, the light transmittance of the light shielding layer may be lower than an average of the light transmittance of pattern 420.

A portion of pattern 420 nearer to the display region may have a high light transmittance, e.g., a light transmittance higher than about 85%. As the pattern approaches light shielding layer 400, light transmittance decreases. As a result, the portion of pattern 420 that is close to the boundary with the light shielding layer 400 may have light transmittance which is very close to the light transmittance of the light shielding layer.

For example, light shielding layer 400 may have a light transmittance close to 0% at or near the boundary and pattern 420 which is adjacent or nearer to the light shielding layer may have light transmittance lower than about 5%. Moreover, the width 'w1' of pattern 420 may be narrower than the width 'w2' of light shielding layer 400 in order for the non-display region to appear to have a wholly black color. By incrementally varying the light transmittance of pattern 420, the boundary between and thus the visual difference between the display and non-display region will be decreased and even be virtually imperceptible at least when power is off.

The light shielding layer 400 and pattern 420 may be formed by printing a black layer. For example, pattern 420 may be formed by varying a density of a black print point used for printing. That is, light shielding layer 400 may printed in the form of a black layer having a uniform print density, and pattern 420 may be printed so that the print density increases as the pattern progresses in a direction in which there is a small light transmittance.

Moreover, the width 'w1' of pattern 420 may be wider than about 2.5 mm so that the boundary between the non-display and display regions, and more specifically between light shielding layer 400 and the display region, is visually imperceptible or harder to see as a result of incrementally decreasing the light transmittance of pattern 420

Because the quality of a displayed image degrades when pattern 420 overlaps the display region, the width 'w1' of pattern 420 may be set within a range in which the pattern does not overlap the display region. Also, to prevent pattern 420 from overlapping the display region due to process error, a distance 'd1' between pattern 420 and the display region may be wider than one-half of a distance 'd2' between the display region and a top ] case 130. The top case 130 may cover the outer region of display module 100 and the non-display region of the front surface of display module 100, to thereby protect it.

A portion of the top case 130 which overlaps the light shielding layer 400 may be screened by second region 410 and thereby is not seen at the front of the display apparatus. Another portion of the top case which overlaps pattern 420 may be seen at the front of the display apparatus.

To prevent the exterior quality of the display apparatus from being degraded by a portion of top case 130 being visible to a user, the top case may be colored in black. For example, only a portion of the top case which overlaps pattern 420 may be colored black.

In FIGS. 11 and 12, light shielding layer 400 and pattern 420 are formed at the first surface (which is closer to display module 100) among the surfaces of the front panel 110. In other arrangements, light shielding layer 400 and pattern 420 may be formed at the second surface which is farther away from display module 100 among the surfaces of the front panel.

As shown in FIG. 13, in another arrangement the light shielding layer 400 and pattern 420 may be formed at a surface of the transparent film 300 that is disposed in front of the front panel 110. In this case, an adhesive layer is formed between the light shielding layer 400 and the front panel 110, and thus the transparent film 300 may be adhered and thereby fixed to the front panel 110.

According to above-described embodiments, the light transmittance of pattern 420 may vary throughout its width or length. By incrementally varying the brightness of the color of pattern 420, the boundary between the display and non-display region will be harder to see or virtually imperceptible. For example, the color of pattern 420 may have the highest level of brightness at a portion which is closest to the display region and brightness may decrease as pattern 420 progresses in a direction toward an outermost edge of the non-display region.

Figure 14:
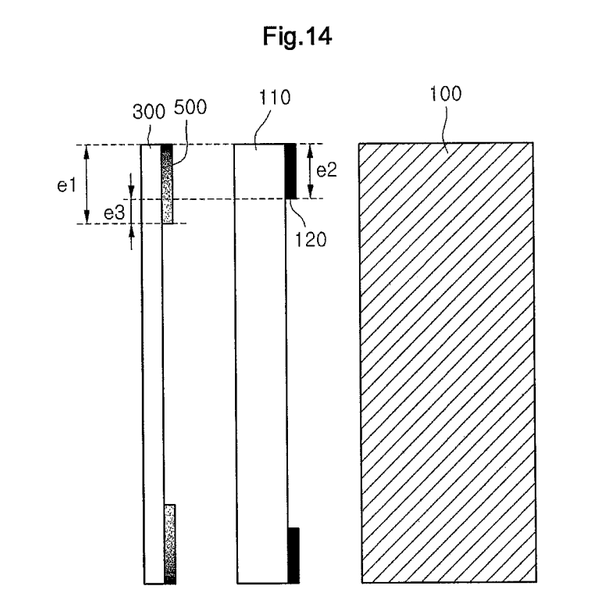
FIGS. 14 to 16 are diagrams showing cross-sectional views of a third embodiment of a display apparatus.
Figure 15:
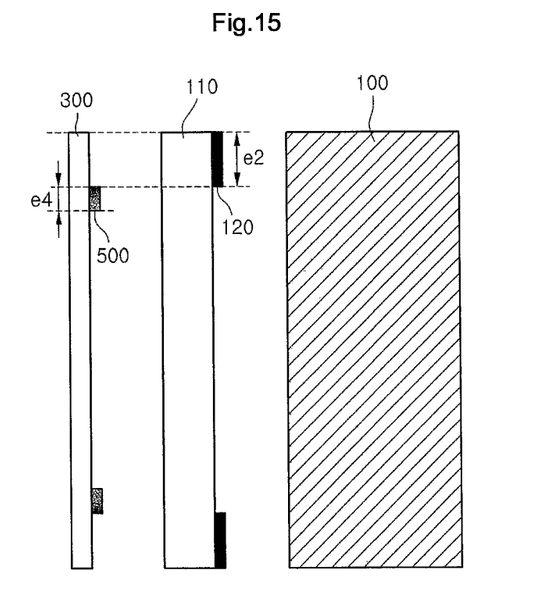
Figure 16:
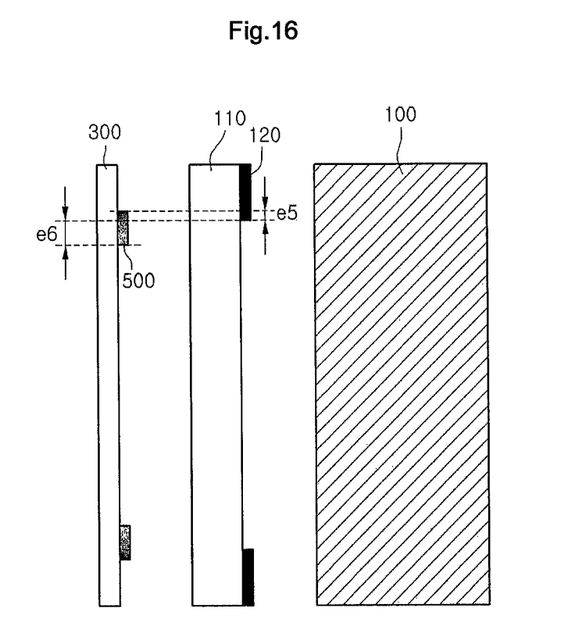

FIGS. 14 to 16 show arrangements according to a third embodiment of a display apparatus. In these figures, a light shielding layer and gradation pattern are formed on different layers, respectively.

Referring to FIG. 14, pattern 500 is formed on a surface of transparent film 300 and a light shielding layer 120 is formed on a surface of front panel 110. The light transmittance of pattern 500 may be varied. For example, the light transmittance of pattern 500 may be at its highest point at a portion nearest to the display region and may decrease as pattern 500 progresses in a direction towards the outermost edge of the transparent film 300. In addition, the light shielding layer 120 may wholly have a uniform light transmittance.

That is, a portion of pattern 500 nearer to the display region may have light transmittance in which most light transmits, for example, light transmittance higher than about 85%. As the pattern approaches the outermost edge of the non-display region, light transmittance of the pattern may decreases. A portion of pattern 500 which is disposed closest to the outermost edge of the non-display region may have light transmittance which is very close to the light transmittance of the light shielding layer 120. For example, the light shielding layer 120 has light transmittance close to 0% and a portion of the pattern disposed closest to the outermost edge of the non-display region may have light transmittance lower than about 5%.

As illustrated in FIG. 14, the width 'e1' of pattern 500 may be wider than the width 'e2' of light shielding layer 120. Therefore, a portion of pattern 500 may be provided to be more adjacent to the display region while not overlapping the light shielding layer 120.

As described above, by disposing pattern 500 (in which light transmittance decreases toward the outer thereof) in front of light shielding layer 120, the boundary between the display and non-display regions and more specifically between the display region and light shielding layer 120 may not be easily perceptible by a viewer.

That is, the light transmittance of a portion of pattern 500 which does not overlap light shielding layer 120 has a maximum value at a portion nearer to the display region. As the pattern becomes farther away from the display region, light transmittance incrementally decreases and the visual difference between the display and non-display regions decrease or become virtually imperceptible.

To prevent the boundary between the light shielding layer 120 and the display region from visually appearing, the width 'e3' of a portion of the pattern 500 which does not overlap the light shielding layer 120 may be set to wider than about 2.5 mm within a range in which the pattern 500 does not overlap with the display region. Moreover, the width 'e1-e3' of a portion of the pattern 500 which overlaps the light shielding layer 120 may be wider than the width 'e3' of a portion of the pattern 500 which does not overlap the light shielding layer 120.

Referring to FIG. 15, in another arrangement the pattern 500 formed at one surface of transparent film 300 may not overlap the light shielding layer 120 according to the position of the inner end of the light shielding layer 120. In this case, a portion of the pattern 500 which is most adjacent to the display region may have light transmittance in which most light transmits, for example, light transmittance higher than about 85%. The outermost portion of the pattern 500 may have light transmittance which is very close to the light transmittance of the light shielding layer 120. For example, the light shielding layer 120 has light transmittance close to 0%, and the outermost portion of the pattern 500 may have light transmittance lower than about 5%.

The width 'e4' of pattern 500 may be narrower than the width 'e2' of light shielding layer 120. To prevent the boundary between light shielding layer 120 and the display region from visually appearing, the width 'e4' of pattern 500 may be set to wider than about 2.5 mm within a range in which pattern 500 does not overlap the display region.

Referring to FIG. 16, in another arrangement a portion of pattern 500 overlaps the light shielding layer 120 and another portion of the pattern does not overlap the light shielding layer 120. The width 'e5' of a portion of the pattern 500 overlaps the light shielding layer 120 may be narrower than the width 'e6' of the other portion of the pattern which does not overlap light shielding layer 120.

To prevent the boundary between the light shielding layer 120 and the display region from visually appearing, the width 'e6' of a portion of pattern 500 which does not overlap light shielding layer 120 may be set to wider than about 2.5 mm within a range in which the pattern does not overlap the display region.

As shown in FIG. 16, by overlapping a portion of the pattern 500 having the narrow width 'e5' with the light shielding layer, the boundary between the display and the non-display regions may appear to be less visually perceptible.

Pattern 500 may be formed by varying the density of a black print point used for printing, e.g., by printing a black layer having a print density that increases as pattern 500 progresses in a direction towards the outermost edge of the non-display region. The light shielding layer 120 may be formed by printing a black layer at a uniform print density.

In FIGS. 14 to 16, an adhesive layer (not shown) may be formed between pattern 500 and front panel 110, and thus the transparent film 300 may be adhered and thereby fixed to the front panel 110.

According to one arrangement, the distance between pattern 500 and the display region may be wider than one-half of the distance between the display region and a top case (not shown) for preventing the pattern 500 from overlapping the display region due to a process error, as described above with reference to FIG. 12. In this case, because a portion of the top case (not shown) which overlaps pattern 500 may be seen at the front of the display apparatus, the top case may be colored in black and thus prevent a visual difference from occurring by the top case.

Figure 17:
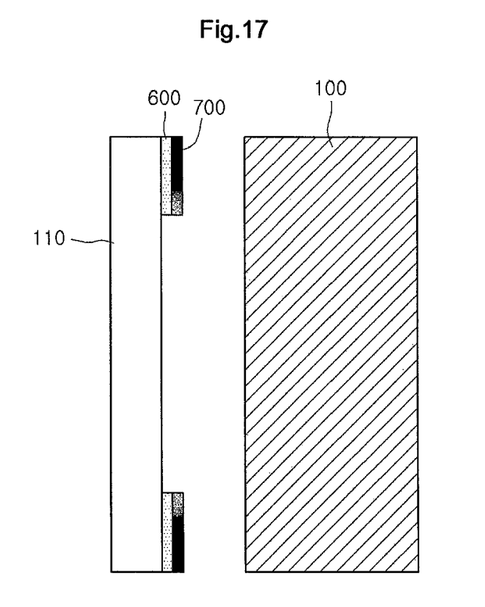
FIGS. 17 to 20 are diagrams showing cross-sectional views of a fourth embodiment of a display apparatus.

FIGS. 17 to 20 show arrangements corresponding to a fourth embodiment of a display apparatus. Referring to FIG. 17, a reflective layer 600, a light shielding layer 700 and gradation pattern 710 may be formed at the one surface of the front panel 110. The configuration of the reflection layer 600 may be the same as that of the reflection layer 200 which has been described with reference to FIGS. 2 to 10, and its description therefore will be omitted. As described above, the reflection layer 600 may be metal thin-film layer which is light-reflexible and light-transmittable.

Moreover, the configuration of the light shielding layer 700 and the pattern 710 may be the same as that of the light shielding layer 400 and the pattern 420 which has been described with reference to FIGS. 11 to 13, and its description therefore will be omitted.

As shown in FIG. 17, by overlapping the reflection layer 600 with the light shielding layer 700 and the pattern 710, a display region and a non-display region may have the same or similar reflection sensitivity and therefore the boundary between the display and non-display regions may be less visually perceptible. Accordingly, the visual difference between the display and non-display regions decreases, and thus the front surface of the display apparatus which is seen by the user may appear as one layer having the same color and reflection sensitivity.

In FIG. 17, the reflection layer 600, the light shielding layer 700 and the pattern 710 are formed at the first surface (which is more adjacent to the display module 100) among the both surfaces of the front panel 110. However, these layers may be formed differently in other arrangements.

Figure 18:
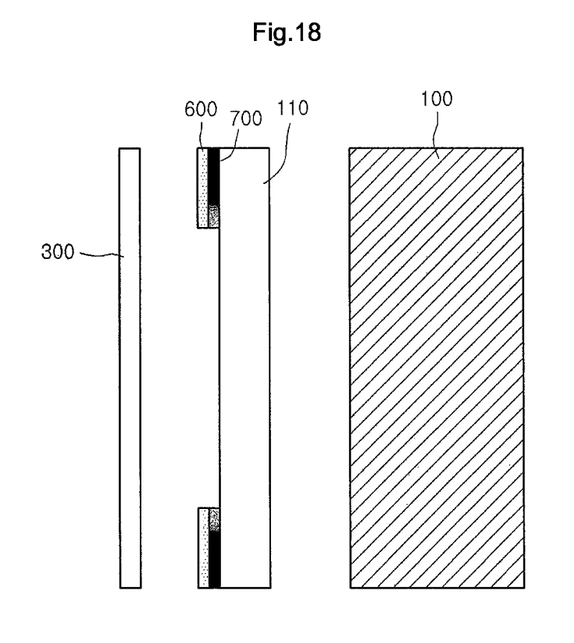

As shown in FIG. 18, in one arrangement the reflection layer 600, light shielding layer 700 and pattern 710 may be formed at a second surface, which is farther away from display module 100 among the surfaces of the front panel 110. Also, reflection layer 600 and light shielding layer 700 may be formed at the surfaces of the front panel 110. Furthermore, the transparent film 300 may be disposed in front of the front panel 110.

Figure 19:
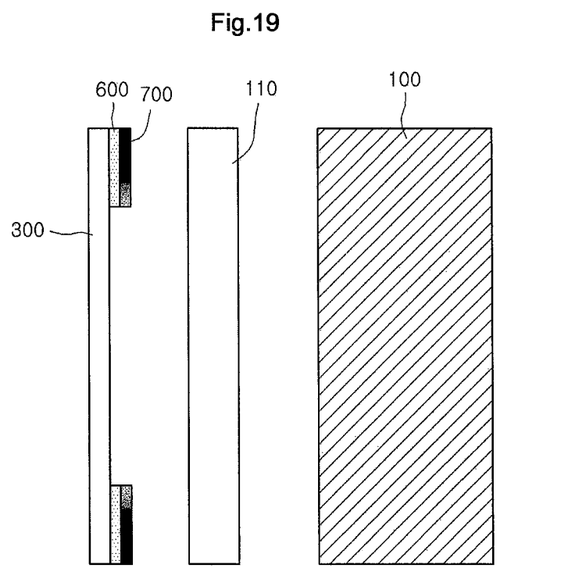

As shown in FIG. 19, the reflection layer 600, light shielding layer 700 and pattern 710 may be formed at transparent film 300 which is disposed in front of the front panel 300. That is, the reflection layer 600, light shielding layer 700 and pattern 710 may be formed at a first surface nearer to the display module 100 among the surfaces of transparent film 300.

Figure 20:
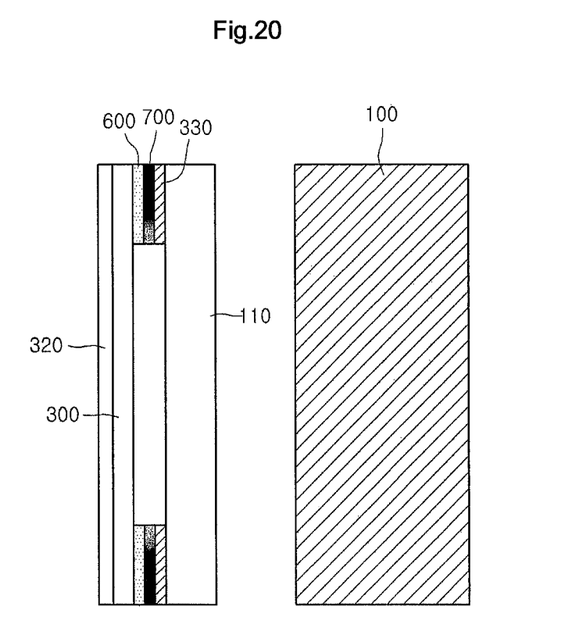

As shown in FIG. 20, in another arrangement by forming an adhesive layer 330 between the light shielding layer 700 and the front panel 110, the transparent film 300 may be adhered and thereby fixed to the front panel 110. Furthermore, a hard coating layer 320 may be formed at the one surface of the transparent film 300.

Figure 21:
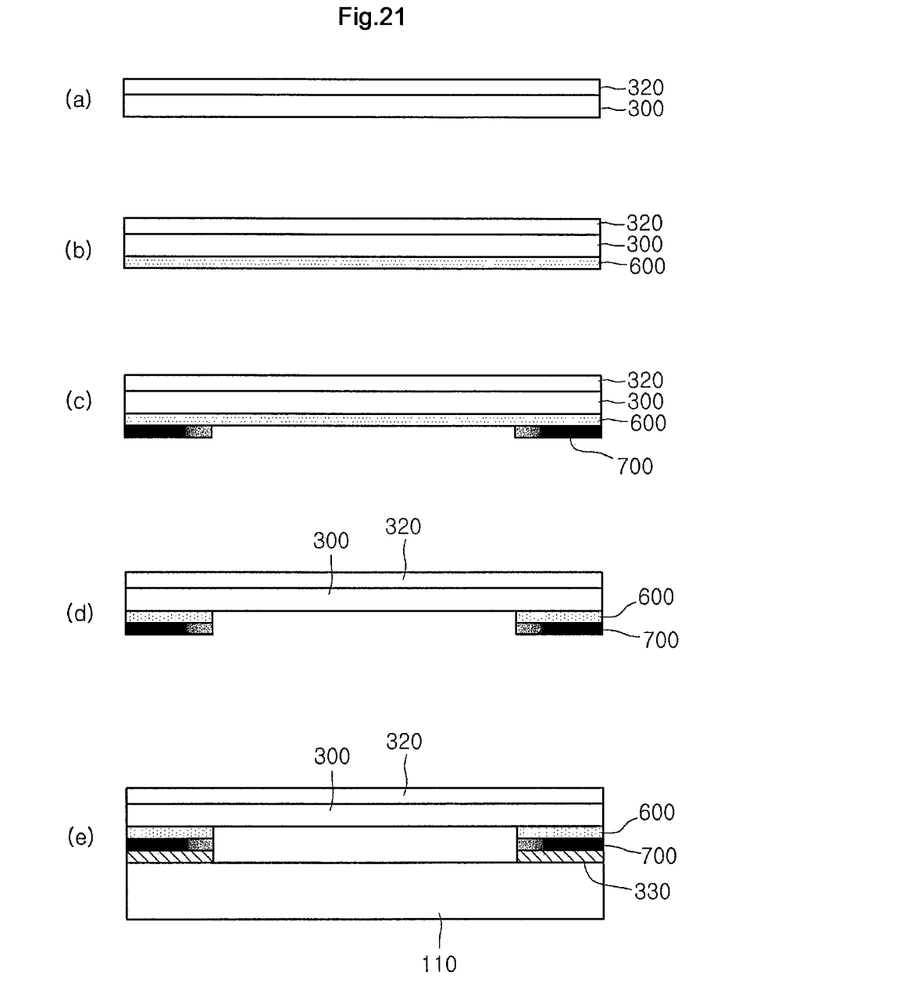

FIGS. 21(a)-(e) show results of process steps included in an embodiment of a method for manufacturing a display apparatus. Referring to FIG. 21(a), the hard coating layer 320 is formed on the transparent film 300 which is formed of PET. As shown in FIG. 21(b), reflection layer 600 may be formed by depositing a metal such as Ni or Al at the lower side surface of the transparent film 300.

As shown in FIG. 21(c), light shielding layer 700 and pattern 710 are formed by printing a black layer at the non-display region on reflection layer 600. For example, light shielding layer 700 and pattern 710 may be formed on reflection layer 600 at once. Or, the light shielding layer 700 and the pattern 710 may be formed on reflection layer 600 separately.

As shown in FIG. 21(d), a portion of the reflection layer 600 in which the light shielding layer 700 and the pattern 710 are not formed is removed through an etching process, wherein the reflection layer 600 is formed at the transparent film 300. As shown in FIG. 21(e), the light shielding layer 700 and the front panel 110 are adhered by the adhesive layer 330.

Figure 22:
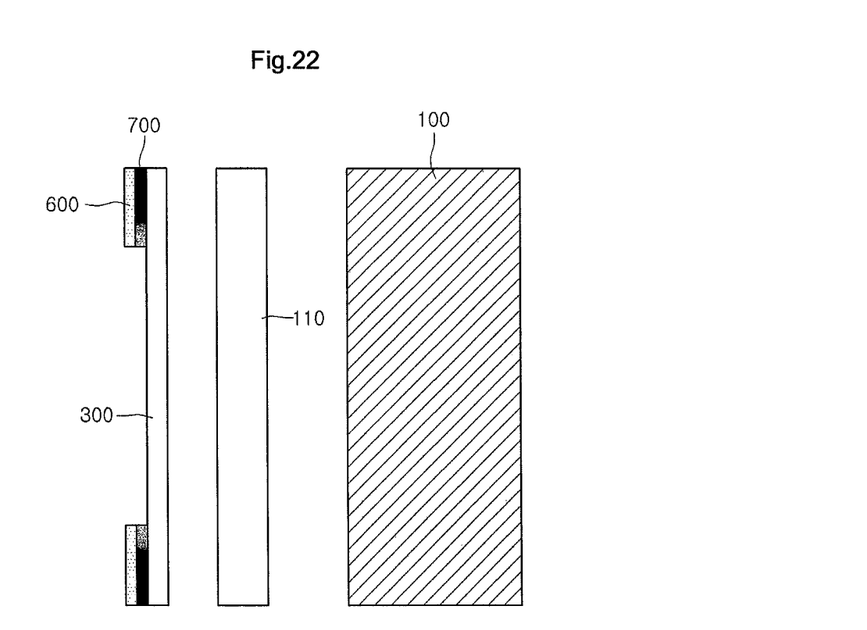
FIGS. 22 and 23 are diagrams showing cross-sectional views of additional arrangements of a display apparatus.

Referring to FIG. 22, the reflection layer 600, the light shielding layer 700 and the pattern 710 may be formed at a second surface, which is farther away from the display module 100, among the surfaces of the transparent film 300.

Figure 23:
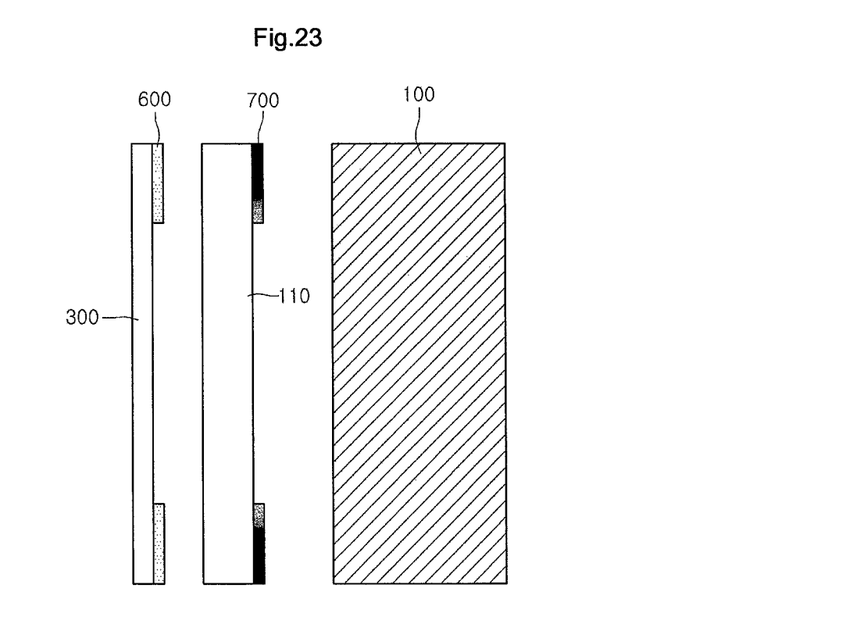

As illustrated in FIG. 23, alternatively, the reflection layer 600 may be formed at the transparent film 300 and the light shielding layer 700 and the pattern 710 may be formed at the front panel 110, respectively.

In accordance with one or more of the foregoing embodiments, by forming the reflection layer at the non-display region of the display apparatus, the visual difference (which is sensed by a user) between the display and non-display regions decrease and can even be made very imperceptible when the display apparatus is powered off. Accordingly, the exterior design of the display apparatus can improve.

Embodiments provide a display apparatus which decreases the visual difference between a non-display region and a display region on which images are displayed, thereby improving the exterior of the display apparatus.

In one embodiment, a display apparatus includes: a display module; a front panel provided in front of the display module; and a pattern formed over the front panel, wherein the pattern provided closer to the edge of the front panel allow less transmittance of light.

In another embodiment, a display apparatus includes: a display module; a front panel provided in front of the display module; a light shielding layer provided over the front panel near a periphery of the front panel; and a pattern formed adjacent to light shielding layer, wherein the pattern provided closer to the light shielding layer allow less transmittance of light.

In further another embodiment, a display apparatus includes: a display module; a front panel provided in front of the display module; a transparent film provided in front of the front panel; a light shielding layer provided over the front panel near a periphery of the front panel; and a pattern formed over the transparent film, wherein the pattern provided closer to the edge of the front panel allow less transmittance of light.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
   a display module;
   a front panel overlapping the display module; and
   a pattern overlapping the front panel, wherein:
   the pattern includes a first portion and a second portion in a non-display region,
   the first portion is closer to an edge of the front panel than the second portion,
   the first portion of the pattern provided closer to the edge of the front panel allows for less transmittance of light than the second portion of the pattern,
   the pattern is provided in front of the display module, and
   a width of the pattern is wider than 2.5 mm.

2. A display apparatus, comprising:
   a display module;
   a front panel overlapping the display module;
   a light shielding layer overlapping the front panel; and
   a pattern formed adjacent to the light shielding layer, wherein:
   the pattern includes a first portion and a second portion,
   the pattern and light shielding layer are located in a non-display region,
   the first portion of the pattern is provided closer to the light shielding layer than the second portion,
   the first portion of the pattern allows for less transmittance of light than the second portion of the pattern,
   the light shielding layer and the pattern are provided in front of the display module, and
   a width of the pattern is wider than 2.5 mm.

3. The display apparatus of claim 2, wherein an average light transmittance of the pattern is greater than an average light transmittance of the light shielding layer.

4. The display apparatus of claim 2, further comprising:
   a top case covering an outer region of the display module, wherein the top case comprises a region which overlaps the pattern.

5. The display apparatus of claim 4, wherein at least a part of the top case has a color that is at least substantially black.

6. The display apparatus of claim 2, wherein the light shielding layer is a black layer located near a periphery of the front panel and has substantially uniform light transmittance.

7. The display apparatus of claim 2, wherein at least one of the light shielding layer or the pattern is formed at a surface of the front panel.

8. The display apparatus of claim 2, further comprising:
   a transparent film provided in front of the front panel,
   wherein at least one of the light shielding layer or the pattern is formed at a surface of the transparent film.

9. The display apparatus of claim 8, further comprising:
   an adhesive layer formed between the light shielding layer and the front panel.

10. The display apparatus of claim 2, further comprising:
    a reflective layer overlapping the light shielding layer and the front panel, wherein the reflective layer is provided in front of the display module in a non-display region.

11. The display apparatus of claim 10, wherein the reflective layer is formed by depositing a metallic material.

12. A display apparatus, comprising:
a display module;
a front panel overlapping the display module;
a transparent film overlapping the front panel;
a light shielding layer overlapping the front panel; and
a pattern overlapping the transparent film, wherein
at least part of the pattern is formed adjacent to light shielding layer,
the pattern includes a first portion and a second portion,
the pattern and light shielding layer are in a non-display region,
the first portion of the pattern provided is closer to an edge of the transparent film than the second portion,
the first portion of the pattern allows for less transmittance of light than the second portion of the pattern,
the light shielding layer and the pattern are provided in front of the display module, and
a width of the pattern is wider than a width of the light shielding layer.

13. A display apparatus, comprising:
a display module;
a front panel overlapping the display module;
a transparent film overlapping the front panel;
a light shielding layer overlapping the front panel; and
a pattern overlapping the transparent film, wherein
at least part of the pattern is formed adjacent to light shielding layer,
the pattern includes a first portion and a second portion,
the pattern and light shielding layer are in a non-display region,
the first portion of the pattern provided is closer to an edge of the transparent film than the second portion,
the first portion of the pattern allows for less transmittance of light than the second portion of the pattern,
the light shielding layer and the pattern are provided in front of the display module,
an image is displayed in the display region, wherein the image is not displayed in the non-display region,
said part of the pattern does not overlap with the light shielding layer, and
a width of said part of the pattern, which does not overlap with the light shielding layer, is wider than 2.5 mm.

14. The display apparatus of claim 13, wherein the pattern is formed at a surface of the transparent film and the light shielding layer is formed at a surface of the front panel.

15. The display apparatus of claim 13, wherein another part of the pattern overlaps the light shielding layer and wherein a width of the part of the pattern which overlaps with the light shielding layer is narrower than another part of the pattern.

16. The display apparatus according to claim 13, wherein the pattern is formed at a surface which is nearer to the display module among surfaces of the transparent film, and wherein the light shielding layer is formed at a surface which is nearer to the display module among surfaces of the front panel.

* * * * *